June 20, 1939.   H. LANGNER   2,163,002
TELEPHONE PAY STATION
Filed Dec. 11, 1935   2 Sheets-Sheet 1

INVENTOR.
HEINRICH LANGNER
BY
ATTORNEY.

June 20, 1939.  H. LANGNER  2,163,002
TELEPHONE PAY STATION
Filed Dec. 11, 1935  2 Sheets-Sheet 2

INVENTOR.
HEINRICH LANGNER
BY
ATTORNEY.

Patented June 20, 1939

2,163,002

UNITED STATES PATENT OFFICE 2,163,002

TELEPHONE PAY STATION

Heinrich Langner, Berlin-Steglitz, Germany, assignor to Telephon-Apparat Fabrik E. Zwietusch and Company, Berlin, Germany Application December 11, 1935, Serial No. 53,845
In Germany January 11, 1935

4 Claims. (Cl. 179—6.3)

This invention relates in general to telephone pay stations and in particular to a telephone pay station which can be applied both to systems having automatic payment control for the more expensive or toll calls and also to systems in which the payment of the more expensive calls is supervised by an operator. It is known for pay stations having automatic payment control for the more expensive calls i. e. pay stations for use in telephone systems having toll traffic, to be provided with the so-called coin impulse contacts. These coin impulse contacts are operated transitorily by the insertion of coins for the purpose of advancing the payment selectors in the exchange by means of the controlling impulse produced in this way. Before commencing to dial, the amount to be paid for the desired connection is inserted and the payment selector in the exchange is set correspondingly. A zone discriminating device is set in the exchange corresponding to the connection set up, the setting of which must agree with the setting of the payment selector, since if the two do not agree the switching through of the connection does not take place.

In the case of pay stations in which the payment for the more expensive calls is supervised by an operator, sounds are produced through the insertion of coins by which the operator can tell the amount of the fee inserted. Pay stations of this type are, however, so arranged that local calls set up over selectors can take place without the control of the operator. This is brought about in these pay stations by an arrangement in which the dial is rendered inoperative until the fee has been inserted so that the subscriber is always forced to insert the local fee before dialling his local call. The collecting of this fee takes place then in dependence upon the call materializing.

In pay stations in which the blocking of the dial is removed by the insertion of coins the switching condition produced by the insertion of the coins must be maintained throughout the duration of the dialling operation. In pay stations with automatic payment control on the other hand current impulses must be produced by the fee insertion, i. e. the contact switched over by the fee insertion must remain in this position only transitorily.

In order to be able to use the pay station in telephone systems with payment controlling devices in the exchange (toll traffic) and also in systems in which the insertion of coins is necessary to render the dial operative, the manner of operation of the switching devices which are operated on the insertion of coins must be capable of adjustment in a simple way. This is effected according to the invention in that an auxiliary device is provided in the pay station by means of which the contact switched over transitorily through the insertion of a coin is held in its operated position until the receiver is replaced. In this way it is possible to use pay stations designed for toll traffic in systems which have not yet been converted to toll traffic working in place of the pay stations provided for these systems. This auxiliary device is so designed that it can be made inoperative at will in the most simple manner so that when the telephone system is converted to toll working the apparatus is immediately applicable to the new mode of operation.

The embodiment is based on an apparatus such as is described in detail in application of F. Appelius and H. Langner for Measured service telephone systems, Serial Number 33,476, filed July 27, 1935.

Figure 1:
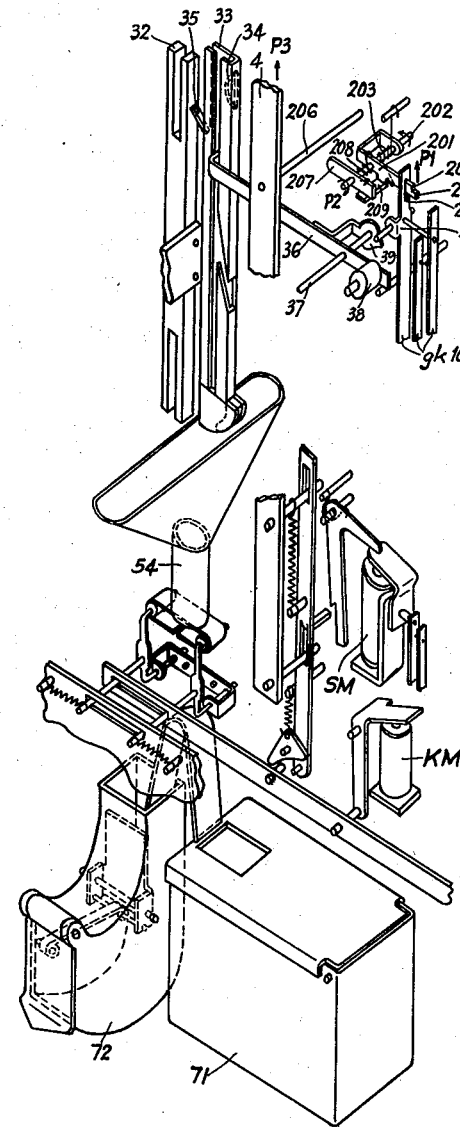
Fig. 1 shows a schematic view in perspective of the essential parts of the apparatus.

As is described in the aforementioned application the lever 36 which is pivoted about the axle 37 is rotated by the insertion and passage of coins in the coin channel 33. This causes the contact spring 40 to be pushed over by the cam 39. The lever 36 returns to its normal position under the influence of the balance weight 38. As the coin passes through the channel 33 it is diverted against the tuned gong 32 by the projections 34 and 35. After the coin has passed through the channel 33 it reaches the receptacle 54 and after replacement of the telephone receiver it is either led into the coin collecting box 71 by the action of the collecting magnet KM or is passed to the returned coin receptacle 72 after the locking magnet SM has deenergized according as to whether the call has materialized or not. In order now that the contact gk10 which is operated on the insertion of a coin shall remain switched over when the coin passes to the receptacle 54, the spring 40 is lengthened and is provided with an aperture 200 through which lever 201 projects. Lever 201 is rotatable about the axle 202 and is acted upon by spring 203 which tends to move the lever 201 in the direction of the arrow P1. The lever 201 is provided with a projection 204 at its front end. The contact spring 40 is held in its working position by means of this projection 204 since when the movement of spring 40 produced by the cam 39 takes place, lever 201 is moved in the direction of the arrow P1 by spring 203. The nose 205 of lever 201 is extended sufficiently far for it still to project through the aperture 200 when the spring 40 is in the operated position. Lever 201 can thus only rotate an amount determined by the height of the part 204. When after the coin has passed the lever 36 the cam 39 returns to its normal position, the contact gk10 remains switched over since spring 40 bears against the upstanding member 204. When the telephone receiver is replaced the bar 4 is moved in the direction of the arrow P3 and by means of lever 206 rotates lever 207. When the receiver is removed lever 206 is below lever 207. On removing the receiver the bar 4 moves in the opposite direction to that shown by the arrow. Lever 206 thereupon strikes against lever 207. Lever 207 which is rotatable about the pin 202 and is pressed by springs 208 against the stop 209 on lever 201, is displaced by the downward motion of lever 206 without effect. On replacing the receiver, however, lever 207 and lever 201 are rotated in the direction of arrow P2 by the upward motion of lever 206. Spring 40 thereupon springs back into its normal position.

In order to use contact gk10 as a coin impulse contact the device indicated by the numbers 200, 201, etc., must be capable of being made inoperative in a simple manner. For this purpose the rod 202 is made square at the end by which it is inserted in the wall of the apparatus. By withdrawing the rod 202 from the wall and rotating it through 90° the lever 201 can be removed from its engagement with contact spring 40, and lever 207 from its engagement with lever 206. Thus the contact gk10 can be adapted either for coin indicating by means of current impulses or for operation involving the release of the short circuit over the dial according as to how the rod 202 is inserted in the wall of the apparatus.

On changing over pay stations from toll working to a system in which the dial short circuit is removed by the insertion of coins and in which the fee payment for the more expensive calls is controlled by an operator, certain circuit alterations are necessary in addition to the alteration to the mode of action of the coin contacts. This, however, may be accomplished in a very simple manner with the aid of a terminal strip to which a definite number of leads are connected as may be seen from Figs. 2 and 3. The terminal strip is arranged in known manner in an easily accessible position in the pay station. When a changeover in the mode of operation is desired the pay stations can thus be adapted by means of simple manipulations on the part of the person effecting the alteration without it being necessary to remove the station from its housing. For this purpose it is merely necessary to loosen certain terminals and to establish different terminal connections in addition to setting the device as described with reference to Fig. 1.

Figure 2:
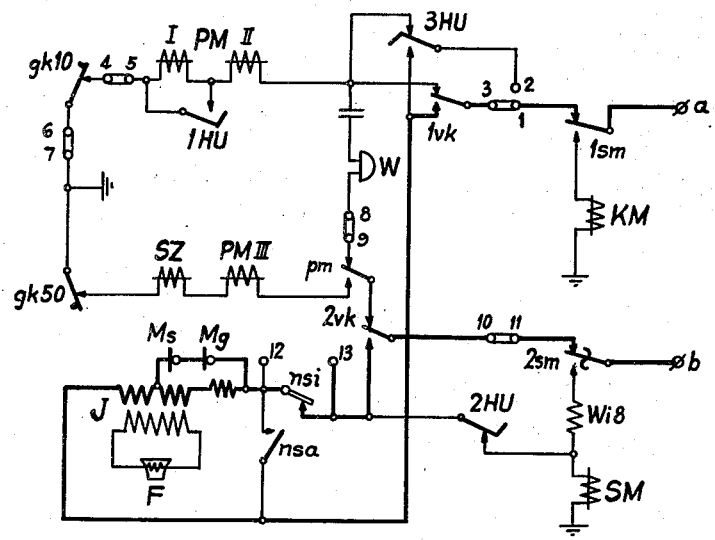
Fig. 2 represents the circuit arrangement of the pay station as arranged for toll working.

Fig. 2 shows the same pay station circuit arrangement as is shown in the aforesaid application. A number of connecting wires are connected to the terminal strip mentioned, the terminals of which are indicated by numbers 1 to 13. In distinction from the aforesaid patent application an additional switchhook contact 3HU is included.

Figure 3:
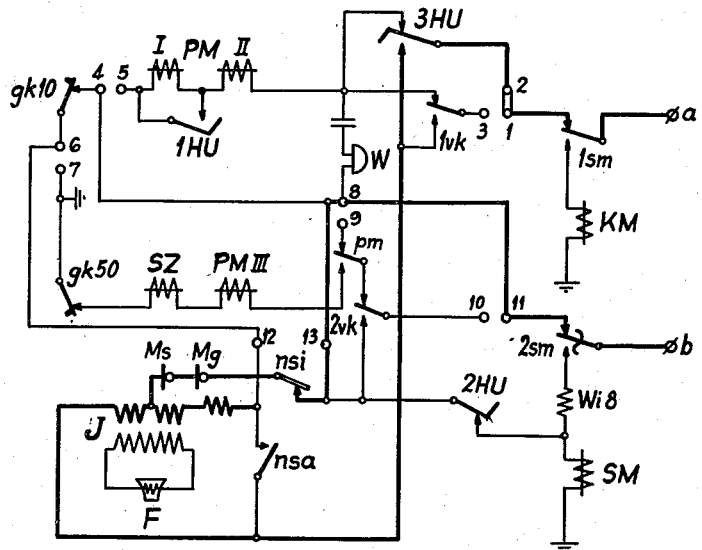
Fig. 3 represents the circuit arrangement of the pay station in which blocking of the dial is removed by the insertion of coins.

When the pay station arranged for toll working as in Fig. 2 is to be used in a system having the payment for expensive calls controlled by an operator and automatic coin release for the dial in the case of local calls, the terminal connections 1—3, 4—5, 6—7, 8—9 and 10—11 are disconnected and the terminals 1 and 2, 6 and 12, 8 and 4, and 11 and 13 are connected up as in Fig. 3. In this way the particular switching devices necessary for toll working such as the magnet PM, the visible signal SZ and the contacts vk controlled by the dial are rendered inoperative. The impulse contact nsi is short circuited by the coin contact gk10 which may be operated by a 10 pfg. piece.

When the calling party wishes to set up a local call he must first insert a 10 pfg. piece so as to allow the dial impulses to proceed without being suppressed. The contact gk10 remains open, as described with reference to Fig. 1, until the receiver is replaced. On setting up a more expensive call the calling party must first insert the basic fee of 10 pfg. as before. As soon as the operator has set up the more expensive call, for example, an express call, she asks the calling party to pay the additional amount which may be paid in 10 pfg., 50 pfg., or one mark pieces. The operation of the coin contact gk10 by the insertion of the 50 pfg. or mark pieces is without effect on the circuit, but the sound produced by the insertion of these coins is transmitted to the operator by means of the gong microphone Mg.

The adaptability of the pay station for conversion from operation involving dial release to operation involving automatic payment control in the exchange is of great importance economically. The conversion of telephone systems to toll working can of course only take place step by step. For a considerable length of time therefore telephone systems with toll working and telephone systems without toll working will be in existence side by side. It is of great importance for the telephone authorities to be able to use standard types of apparatus, having regard to the maintenance of the apparatus and the production and fixing of parts necessary for replacement. Considerable advantage is also obtained in production since with an apparatus which can be applied to all systems the individual parts can be manufactured in correspondingly large number thereby decreasing the cost of the apparatus.

What is claimed is:

1. In a pay station telephone, a set of contacts, means for operating said contacts responsive to the depositing of coins, means normally effective for locking said contacts in operated condition upon the deposit of a single coin, and means for at times rendering said locking means ineffective to thereby permit operation of said contacts by a plurality of coins.

2. In a pay station telephone system, a telephone set having coin-operated contacts, connections for said contacts for shunting the impulse sender at the set when the contacts are closed, means normally responsive to the deposition of a coin for operating said contacts to remove the shunt from the impulse springs, locking means normally holding said contacts operated, and means operated at will to change the connections to the contacts so as to cause impulses to be transmitted each time the springs are operated, and for rendering said locking means ineffective to function in its normal manner.

3. In a pay station telephone set, contact springs, means controlled by the deposit of coins in the set for operating said springs, locking means effective when a single coin is deposited to hold the contacts operated, an impulse sender in the set, a shunt circuit around the sender controlled by said contacts, an auxiliary locking device operated when a single coin is deposited to hold the contacts in operated position, said device adjustable to inoperative position to prevent its holding the contacts operated in case the calls are of a type where such holding is not desired.

4. A pay station telephone set adjustable for use in two types of telephone systems, an impulse sender, a set of contacts, said contacts operated responsive to the deposit of coins in the set, connections controlled by the contacts for controlling a shunt around said sender, a device operated to lock the contacts in operated position when used in one type of system when first operated, said device adjustable to prevent the locking and to permit more than one operation of the contacts in one call when used in another type of system, and means in said pay station telephone set for changing the connections to said contacts to adapt it for use in either type of system.

HEINRICH LANGNER.